United States Patent [19]

Gill

[11] Patent Number: 5,092,739
[45] Date of Patent: Mar. 3, 1992

[54] ELECTRONIC PUMP CONTROL

[75] Inventor: David C. Gill, Keynsham, England

[73] Assignee: Nomix Manufacturing Company Limited, Bristol, United Kingdom

[21] Appl. No.: 435,440

[22] PCT Filed: May 16, 1988

[86] PCT No.: PCT/GB88/00384
§ 371 Date: Dec. 20, 1989
§ 102(e) Date: Dec. 20, 1989

[87] PCT Pub. No.: WO88/09005
PCT Pub. Date: Nov. 17, 1988

[30] Foreign Application Priority Data

May 14, 1987 [GB] United Kingdom ............... 8711369

[51] Int. Cl.$^5$ .............................................. F04B 49/06
[52] U.S. Cl. ........................................ 417/45; 417/18
[58] Field of Search ................................... 417/18, 45

[56] References Cited

U.S. PATENT DOCUMENTS

| | | | |
|---|---|---|---|
| 3,966,358 | 6/1976 | Heimes et al. | 417/18 |
| 4,108,574 | 8/1978 | Bartley et al. | |
| 4,350,293 | 9/1982 | Lestradet | 222/63 |
| 4,553,702 | 11/1985 | Coffee et al. | 239/159 |
| 4,617,637 | 10/1986 | Chu et al. | 417/18 |
| 4,805,088 | 2/1989 | Cross et al. | 239/155 |
| 4,878,598 | 11/1989 | Ruschhaupt, Jr. | 239/159 |
| 4,897,797 | 1/1990 | Free, Jr. et al. | 417/18 |

FOREIGN PATENT DOCUMENTS

| | | |
|---|---|---|
| 0155850 | 9/1985 | European Pat. Off. |
| 0191287 | 8/1986 | European Pat. Off. |
| 0201658 | 11/1986 | European Pat. Off. |
| 2102987 | 2/1983 | United Kingdom |
| 2123174 | 1/1984 | United Kingdom |

Primary Examiner—Richard A. Bertsch
Assistant Examiner—David W. Scheuermann
Attorney, Agent, or Firm—Merchant, Gould, Smith, Edell, Welter & Scmidt

[57] ABSTRACT

There is disclosed an electronic control means for a pump, the control means comprising: input means, for accepting input signals, the input signals being indicative of the values of variable quantities which determine a desired flow rate of a fluid which, in use, is to be supplied by a pump; an electronic memory, comprising a plurality of memory locations, each memory location corresponding to a particular combination of values of the variable quantities and containing a stored control signal corresponding to the desired fluid flow rate determined by those values; and output means, for supplying the control signal, in use, to the pump. More specifically, there is disclosed equipment suitable for distributing a fluid over an area of land, the equipment comprising distribution means, to which fluid is supplied by a pump driven by an electric motor, the delivery rate of the fluid from the pump being a function of the operating speed of the pump, the equipment further comprising such control means.

14 Claims, 5 Drawing Sheets

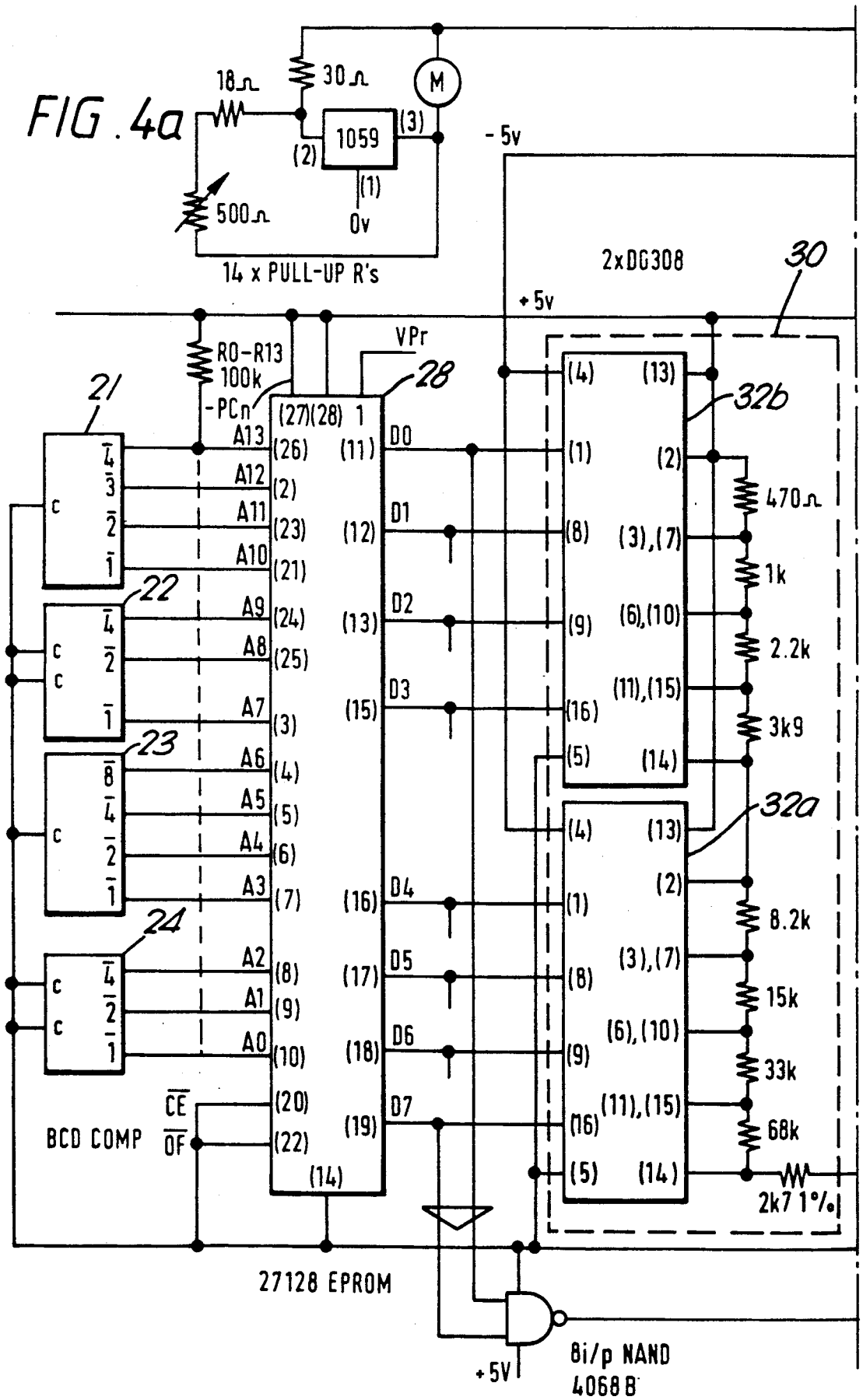

ELECTRONIC PUMP CONTROL

This invention relates to an electronic control means, which is particularly intended to be used to control the operation of a pump.

In common use is a small electric pump, operated by a D.C. motor, the operation of the motor, and hence the flow rate of fluid supplied by the pump, being controlled by a voltage applied to the pump. In many circumstances, for example when applying a potent and expensive weedkiller to an area of land, it is important to deliver a quantity of fluid which can be accurately measured and controlled. In such circumstances, it is important to be able to supply to the pump an input signal which may be varied with the particular operating conditions, but which may be accurately maintained once set.

Moreover, in known weedkiller delivery units, the delivery device itself is a hand-held piece of equipment, used by an operator walking across the area to which the weedkiller is to be applied. In these circumstances, it is advantageous if any control means for the pump additionally forms part of the hand-held equipment, in which case it must be made small, light and robust.

According to the present invention, there is provided an electronic control means for a pump, the control means comprising:

input means, for accepting input signals, the input signals being indicative of the values of variable quantities which determine a desired fluid flow rate which, in use, is to be supplied by a pump;

an electronic memory, comprising a plurality of memory locations, each memory location corresponding to a particular combination of values of the variable quantities and containing a stored control signal corresponding to the desired fluid flow rate determined by those values; and output means, for supplying the control signal, in use, to the pump.

In a preferred embodiment of the invention, the variable quantities, which may be input by an operator, and which determine the desired fluid flow rate, are the width of a strip of land which is to be sprayed, the volume of fluid which is to be applied to a unit area of that land, and the linear speed of the distribution means along the strip.

More specifically, the present invention provides equipment suitable for distributing a fluid over an area of land, the equipment comprising distribution means, to which fluid is supplied by a pump driven by an electric motor, the delivery rate of the fluid from the pump being a function of the operating speed of the pump, the equipment further comprising control means for controlling the operating speed of the pump, the control means comprising a memory in which are stored data representing desired delivery rates of fluid under different operating conditions of the equipment, the stored data being output when information concerning the operating conditions is supplied to the control means, and output data being supplied to the electric motor to control the operation thereof.

For a better understanding of the present invention, and to show how it may be carried into effect, reference will now be made, by way of example, to the accompanying drawings, in which:

FIG. 1 illustrates the control system which is associated with conventional pumps. A pump control 1 acts upon an input voltage VIN to cause a pump 2 to rotate at a speed proportional to the applied voltage.

FIG. 2 illustrates the characteristic of the system. Thus, increasing the speed of rotation of the motor in the pump 2 produces, generally, an increase in the rate of flow of fluid supplied by the pump, although this relationship is non-linear.

Figure 1:
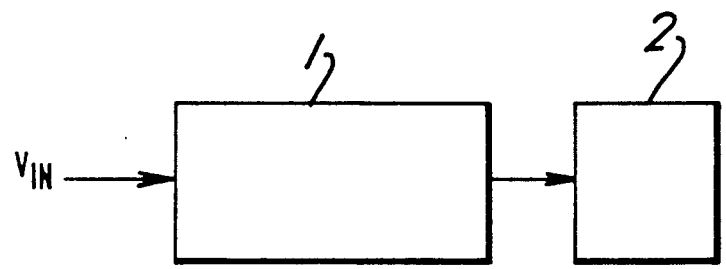
FIG. 1 is a block diagram illustrating the known control system associated with a conventional pump.
Figure 2:
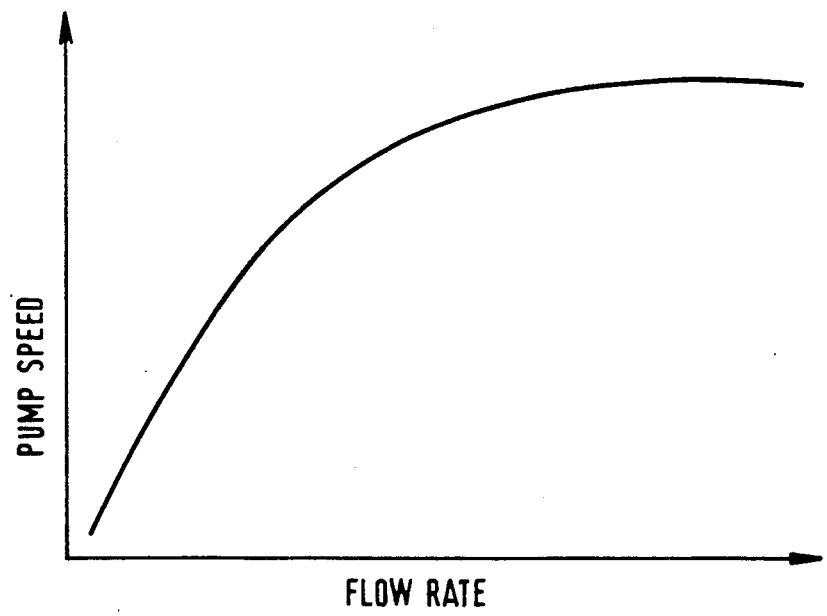
FIG. 2 is a plot of the pump speed/flow rate characteristic of a known pump.

The range of flow rates which it will be necessary to supply will be known, and the desired flow rate for any particular set of operating circumstances may be calculated. For example, if the pump is to supply fluid which is to be applied to an area of land, the flow rate required is equal to the product (in appropriate units) of the volume of fluid to be applied to a unit area of land, the width of a strip to which fluid is to be applied, and the linear speed of the spraying apparatus along the strip. Once the desired flow rate is known, then so, from FIG. 2, is the required pump speed. The present invention is concerned with manipulating inputs corresponding to the variables which determine the desired flow rate and generating an output signal which, applied to the known pump, will produce the appropriate flow rate.

Figure 3:
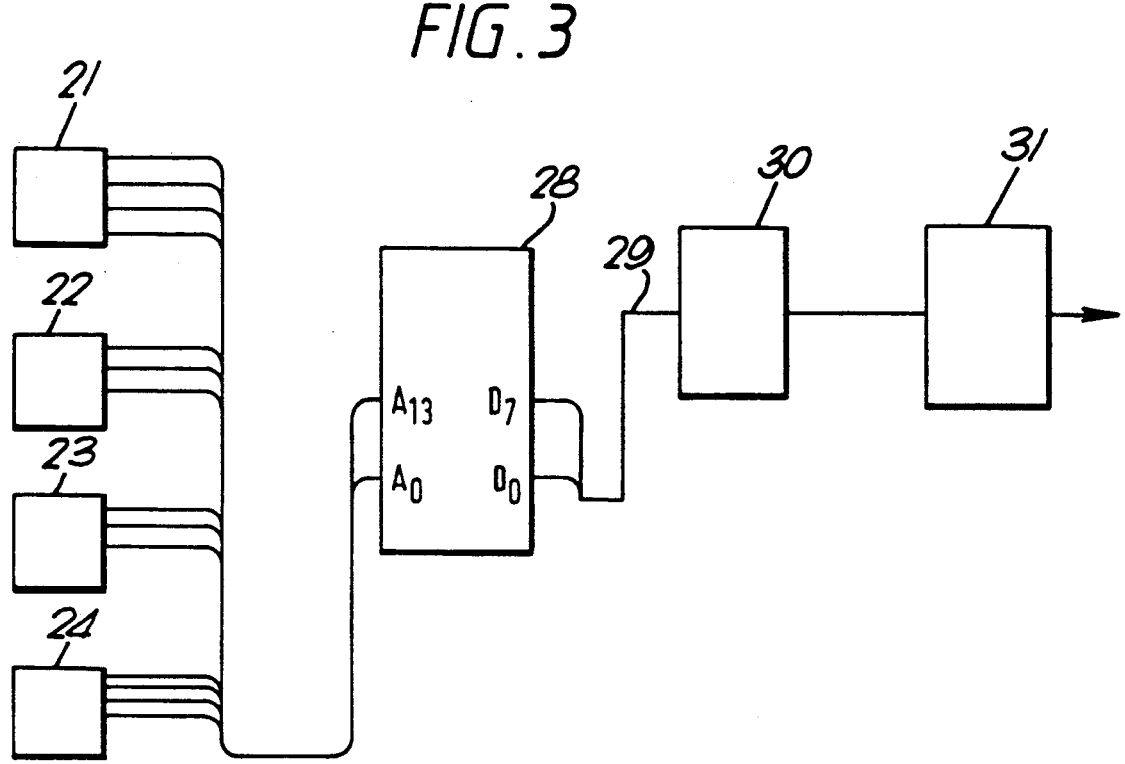
FIG. 3 shows, schematically, an electronic control means in accordance with an embodiment of the invention.

FIG. 3 shows an embodiment of the invention, in which the inputs comprise four digital signals. In the embodiment illustrated, the inputs 21, 22, 23, 24 are each capable of accepting either a 3 or 4 bit digital input signal.

For example, in a preferred embodiment of the invention, three input variables are, as described above, the volume of fluid per unit area of land, the width of a strip of land to be sprayed, and the linear speed of the sprayer. The width may be chosen to be any one of eleven available values, and so a 4 bit input is allocated to this variable. The other two flow rate determining input variables may each take any one of eight available values, and thus to each of these variables is allocated a 3 bit input. Each available value of the inputs might be allocated to an integer or non-integer value (in appropriate units, such as liters per hectare, meters, or miles per hour) of the variable, as is necessary to give the required accuracy.

However, using the example given above and allocating an integer value of the respective unit to each available input signal, if the width to be sprayed is 1 meter, this might be input at input means 22 as the binary signal 0001. Similarly, a speed of 2 mph (0.89 m/s) might be input at input means 21 as the binary signal 010, and a volume of 5 liters per hectare might be input at input means 23 as binary signal 101.

The fourth input 24 is provided to allow scaling of the output signal. The flow characteristics of the pump will depend upon the properties of the fluid being used and may also vary with time as a result of wear. Thus, before using the device, a flow test may be carried out, with the actual flow rate achieved for a given set of input parameters being compared with a nominal flow rate. The actual flow rate might vary, for example, from 65% to 135% of the nominal rate, and this percentage may be used to determine which of the available scaling factors is input at 24. In other circumstances, it may be appropriate to use a different set of variables, and such a different set may include more or less than four variables.

For example, the electronic control system may be used in conjunction with spray equipment which is designed to be operated at a constant speed, and which incorporates means for ensuring that the speed is held constant. In such a situation, it would not be necessary to include a means for inputting a value for the speed, as appropriate compensation for this could be incorporated in the control system 1 of the pump.

Similarly, the electronic control system would need to accommodate more than three input flow rate determining variables if the system was designed such that, for example, the operator walking holding the device was required to input not a linear speed but a pace length and a time taken for each pace.

The inputs from the input means are combined in line 27, to form a 14 bit digital address. This address corresponds to a particular location in a memory 28, which may be ROM, PROM, or EPROM. Stored at this location may be a digital signal corresponding to the desired pump speed required for the particular values of width, speed, volume and the scale factor uniquely specified by this address. If the memory 28 is 8 bits wide, then 256 output signals are available.

Alternatively, the selected combination of input variables may be such that the required pump speed is higher than the maximum speed of the pump or lower than the minimum speed at which the pump operates reliably. In that case, a suitable warning signal may be provided.

In effect, the provision of the scale input 24 allows up to sixteen different flow curves to be stored, and the selected input may be the one, for which the flow curve corresponds most closely to the actual characteristic of the pump at that time, and using the required fluid.

The digital signal stored at the selected address in the memory 28 is passed along a line 29 to electronic switching circuitry 30, the output of which is fed to a pulse width modulator 31.

The pulse width modulator 31 provides output pulses, the mark-space ratio of the output signal depending upon the signal fed from the electronic switching circuitry 30 to the pulse width modulator 31. In the preferred embodiment of the invention, the pulse width modulator 31 provides a series of pulses, each of duration 18ms, although this pulse width may be varied if desired, and the time between pulses varies from 0 to 0.75s. This signal, in which each pulse is of 8.0V, is then fed to the pump motor.

The reason for providing a pulse width modulated signal in this way, rather than, for example, altering the magnitude of a voltage fed to the pump motor, is to allow the use of a relatively small motor, which would be unable to provide sufficient output torque at low input voltages.

The pulsed signal provided by the pulse width modulator 31 causes the motor to step, rotating for a short distance at a time. However, the time taken for fluid to flow along most flow lines ensures that this stepping does not prevent an even flow of fluid at the delivery head.

Figure 4B:
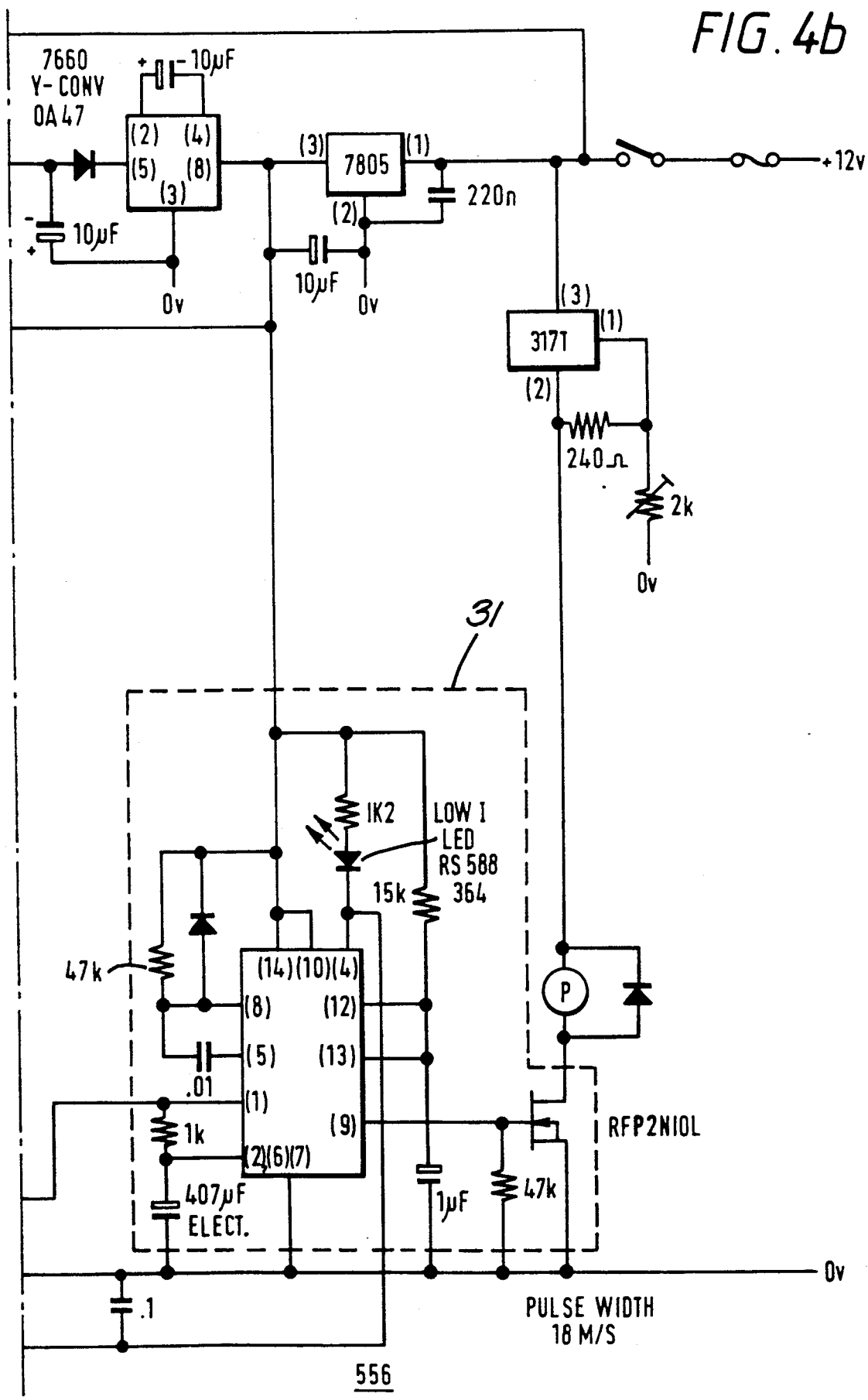
FIG. 4 shows, in more detail, the circuitry of the embodiment illustrated in FIG. 3.

In FIG. 4, the circuit embodiment shown in FIG. 3 is illustrated in more detail. In particular, it can be seen that the switching circuitry 30 comprises a pair of switching ICs 32a, 32b, which determine which resistors in a resistor ladder 33 are short-circuited, and hence determine the size of the output signals fed to the pulse width modulator circuitry 31.

The inputs may be supplied to the input means by rotating dials, or, with suitable modifications to the circuitry, shown in FIG. 4, by using a suitably connected keypad.

In a further modification, one or more of the digital inputs may be determined, not directly the operator, but by sensors associated with the equipment. For example, the speed of movement of a towed system could be digitised and used instead of an input set by the operator. Similarly, if the electronic control means is to be used in conjunction with a known device in which the width of the strip which is to be sprayed is determined by the speed of rotation of discs in the head of the spraying equipment, the "width" input may be obtained, not directly from the operator, but from the voltage control means by which the operator controls the speed of rotation of those discs.

Figure 7:
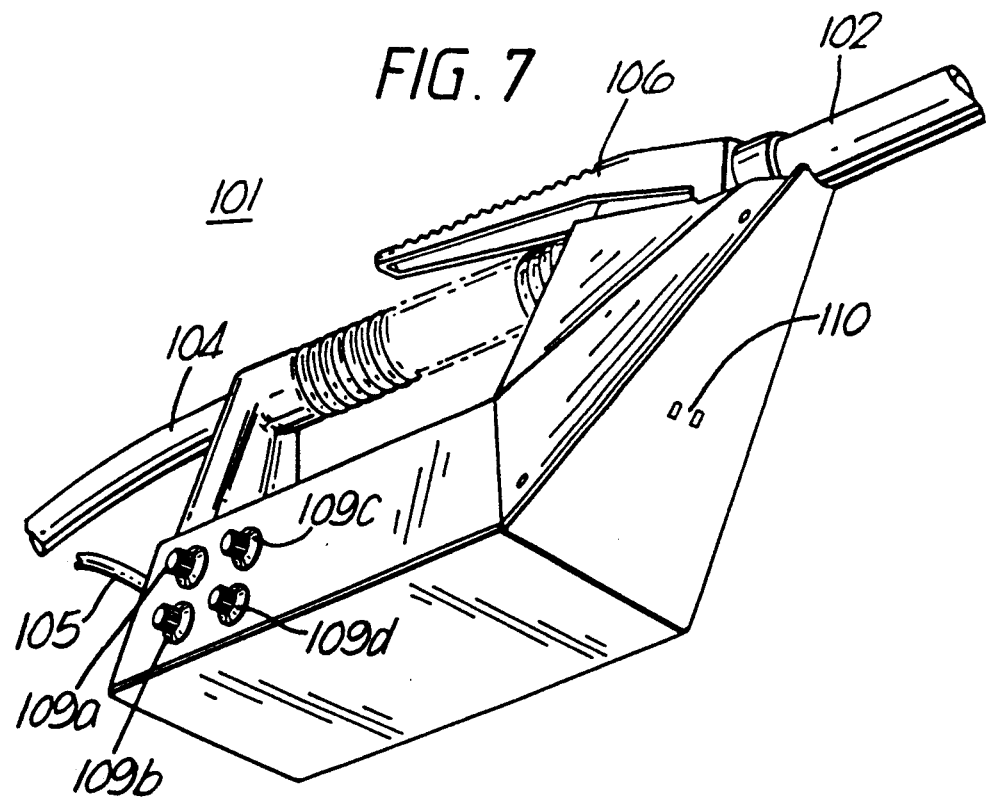
FIG. 7 is a different perspective view of the handle shown in FIG. 6.
Figure 5:
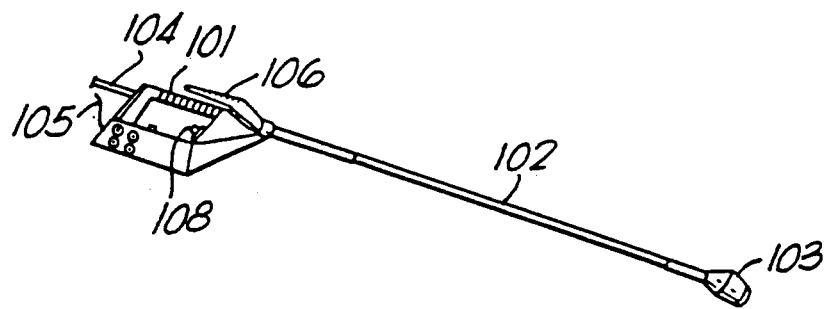
FIG. 5 illustrates the type of equipment which may be provided with control means according to the present invention.
Figure 6:
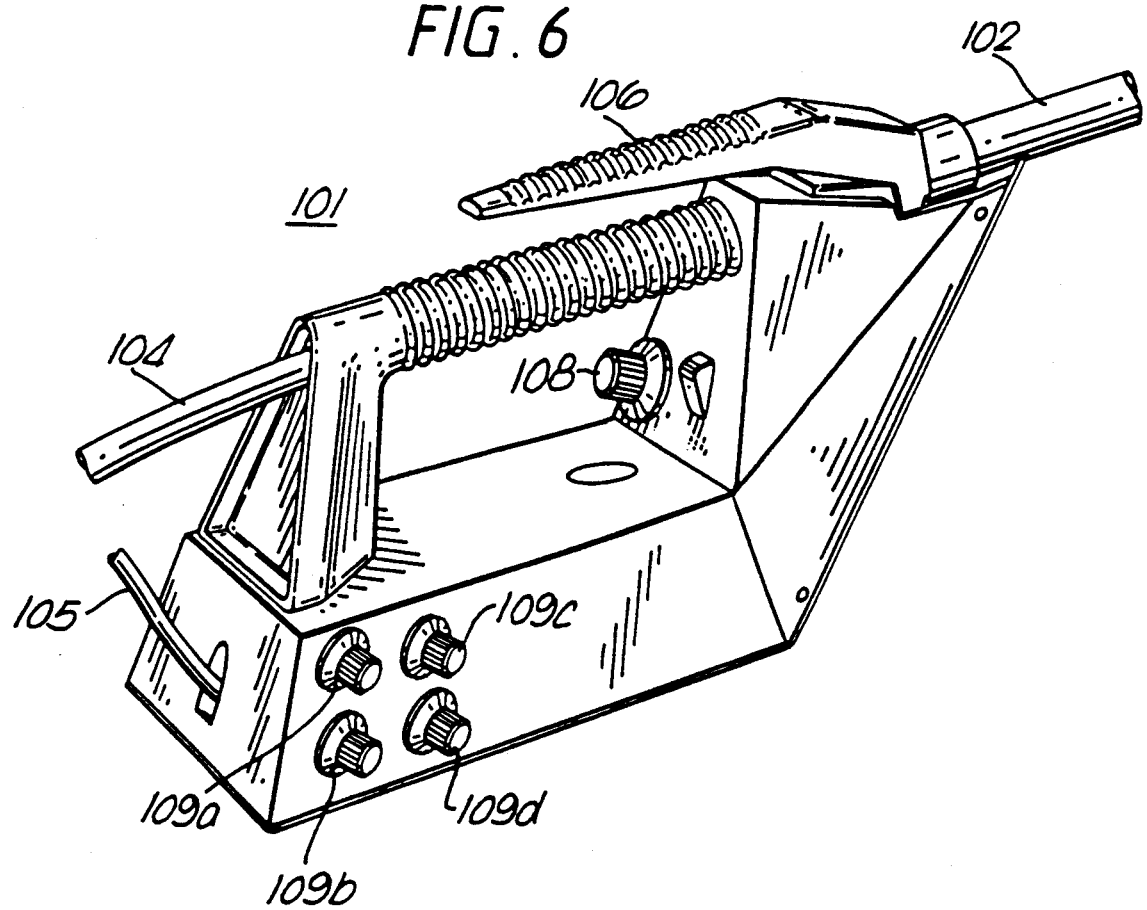
FIG. 6 is an enlarged perspective view of the handle of the equipment shown in FIG. 5.

FIGS. 5 to 7 illustrate spraying equipment, with which the control circuitry of the present invention may be used. The equipment comprises a lance 100, having a handle 101, a fluid passage 102, and a head 103. Thus this equipment is designed to be carried by a pedestrian. Fluid is supplied along an inlet pipe 104, and then along the fluid passage 102 to the head 103. Located in the head 103 are rotating discs, which create droplets of the fluid, for example a herbicide, which are then dispersed.

The fluid delivery rate is controlled by a pump, powered by an electric motor, and is designed to be carried separately by the pedestrian operator, for example as a backpack. Electrical connection between the control circuitry and the electric motor is provided by a lead 105. To prevent possibly dangerous fluids being inadvertently sprayed, the handle is designed such that fluid is allowed to flow along the passage 102 only when a gripping element 106 is squeezed against the body of the handle 101. Located on the handle 101 are an on-off switch 107 and a rotary switch 108, for controlling the speed of rotation of the discs located in the head 103. Also located on the handle 101 are four further control knobs 109a, 109b, 109c, 109d, which may be rotated to input, into the control circuitry according to the present invention, the appropriate values of the variable quantities which are being used to determine the required fluid delivery rate.

The handle may be provided with a power source for the control circuitry or the spinning discs, such as one or more rechargeable battery. Thus, the handle is further provided with a socket 110, allowing recharging to take place when the equipment is not in use.

Thus, embodiments of the present invention provide electronic control means which, while of simple design and easily portable, can accurately control the rate of application of a fluid.

I claim:

1. Equipment for distributing a fluid over an area of land, the equipment comprising:

a pump, for supplying fluid at a rate dependent upon a pump control signal;

an electric motor for driving the pump;

distribution means, to which fluid is supplied by the pump at a delivery rate;

means for inputting a first input signal, indicative of a value of a first variable factor which determines a desired value of the delivery rate;

means for inputting a second input signal, indicative of a value of a second variable factor which determines the desired value of the delivery rate;

control means, for receiving the first and second input signals and supplying to the pump an output pump control signal, the control means including an electronic memory having a plurality of addressable locations at which respective control values are stored, the first and second input signals together defining an address of one memory location and the control value stored at that location being supplied to the pump as the pump control signal.

2. Equipment as claimed in claim 1, wherein the distribution means comprises a rotatable disc, to which fluid is supplied, and a disc motor for causing rotation of the disc such that such rotation during movement of the distribution means causes the fluid to be distributed over a strip of land, the width of the strip depending on the speed of rotation of the disc.

3. Equipment as claimed in claim 2, further comprising means for inputting an input signal indicative of the desired width of the strip, the input signal being supplied as an input signal to the control means and to the disc motor to control the speed of rotation of the disc.

4. Equipment as claimed in claim 1, wherein the second variable factor is a scale factor.

5. Equipment as claimed in claim 4, wherein the value of said scale factor is selected in dependence on the result of a calibration test.

6. Equipment as claimed in claim 4, wherein the value of said scale factor is selected in dependence on the fluid being used.

7. Hand-held fluid distribution equipment for distributing a fluid over an area of land, the equipment comprising:

a handle;

distribution means, comprising a rotatable disc;

a rigid shaft interconnecting the handle and the distribution mans, and supplying fluid from the handle to the disc at a delivery rate;

a disc motor for causing rotation of the disc in order that such rotation during movement of the distribution means causes the fluid to be distributed over a strip of land, the width of the strip depending on the speed of rotation of the disc;

a pump, for supplying fluid from the handle at the delivery rate, the delivery rate being dependent upon a pump control signal;

an electric motor for driving the pump;

means mounted on the handle for inputting a first input signal, indicative of a value of a first variable factor which determines a desired value of the delivery rate;

means mounted on the handle for inputting a second input signal, indicative of a value of a second variable factor which determines the desired value of the delivery rate;

control means, for receiving the first and second input signals and supplying to the pump an output pump control signal, the control means including an electronic memory having a plurality of addressable locations at which respective control values are stored, the first and second input signals together defining an address of one memory location and the control value stored at that location being supplied to the pump as the pump control signal.

8. Equipment as claimed in claim 7, wherein the second variable factor is a scale factor.

9. Equipment as claimed in claim 8, wherein the value of said scale factor is selected in dependence on the result of a calibration test.

10. Equipment as claimed in claim 8, wherein the value of said scale factor is selected in dependence on the fluid being used.

11. Equipment suitable for distributing a fluid over an area of land, the equipment comprising:

(a) distribution means, to which fluid is supplied by a pump driven by an electric motor, the delivery rate of the fluid from the pump being a function of the operating speed of the pump;

(b) an electronic control means for a pump, the control means comprising:

(i) input means, for accepting input signals, the input signals being indicative of the values of variable factors which determine a desired flow rate of a fluid which, in use, is to be supplied by a pump;

(ii) an electronic memory, comprising a plurality of memory locations, each memory location corresponding to a particular combination of values of the variable factors and containing a stored control signal corresponding to the desired fluid flow rate determined by those values; and (iii) output means, for supplying the control signal, in use, to the pump;

(c) wherein the variable factors, which determine the desired fluid flow rate, comprise at least one of the following:

(i) the width of a strip of land over which fluid is to be distributed;

(ii) the volume of fluid which is to be applied to a unit area of that land; and (iii) the linear speed of the distribution means along the strip.

12. Equipment as claimed in claim 11, wherein the variable factors comprise a scale factor.

13. Equipment as claimed in claim 12, wherein the value of said scale factor is selected in dependence on the result of a calibration test.

14. Equipment as claimed in claim 12, wherein the value of said scale factor is selected in dependence on the fluid being used.

* * * * *

UNITED STATES PATENT AND TRADEMARK OFFICE
CERTIFICATE OF CORRECTION

PATENT NO.   :   5,092,739
DATED        :   3 March 1992
INVENTOR(S)  :   David C. Gill It is certified that error appears in the above-identified patent and that said Letters Patent is hereby corrected as shown below:

Column 2, line 17, delete "VIN" and insert --$V_{In}$--.

Column 4, line 4, delete "4" and insert --5--.

Column 4, line 4, delete "3" and insert --4--.

Column 4, line 13, delete "4" and insert --5--.

Column 5, line 50, delete "mans" and insert --means--.

Signed and Sealed this

Seventeenth Day of August, 1993

Attest:

BRUCE LEHMAN

Attesting Officer

Commissioner of Patents and Trademarks